United States Patent [19]

Tada et al.

[11] Patent Number: 4,697,978

[45] Date of Patent: Oct. 6, 1987

[54] INDUSTRIAL ROBOT

[75] Inventors: Haruo Tada, Kobe; Akiyoshi Nakada, Suita, both of Japan

[73] Assignee: Matsushita Electric Industrial Co., Ltd., Kadoma, Japan

[21] Appl. No.: 759,436

[22] Filed: Jul. 26, 1985

[30] Foreign Application Priority Data

Jul. 26, 1984 [JP] Japan .................................. 59-155852

[51] Int. Cl.⁴ .............................................. B25J 17/00
[52] U.S. Cl. ..................................... 414/729; 310/86; 901/28
[58] Field of Search ................... 414/735, 8, 291, 729; 901/15, 23, 24, 27-29, 43; 277/3, 53, 55, 56, 152, 226; 310/86, 88, 90

[56] References Cited

U.S. PATENT DOCUMENTS

| | | | |
|---|---|---|---|
| 2,452,248 | 10/1948 | Lee | 310/88 |
| 3,447,000 | 5/1969 | Dugan et al. | 310/88 X |
| 3,532,399 | 10/1970 | Gray | 277/53 X |
| 3,867,060 | 2/1975 | Huber | 277/54 X |
| 4,168,394 | 9/1979 | Yuey | 277/3 X |
| 4,518,308 | 5/1985 | Grzybowski et al. | 901/28 X |
| 4,531,747 | 7/1985 | Miura | 277/134 |

*Primary Examiner*—Robert J. Spar
*Assistant Examiner*—Donald W. Underwood
*Attorney, Agent, or Firm*—Wenderoth, Lind & Ponack

[57] ABSTRACT

The disclosure relates to an industrial robot free from generation of dust, which is provided with and internal space formed by covering rotating portions and contact portions of its arm members, joint members, bearing members or driving source, by the arm members, joint members, bearing members, or a cover member, or by a combination of these members, and air throttling portions provided in air passages for connecting the internal space with external air so as to separate the internal spaced from external air by sucking the air in the internal space. By the above air throttling portions, air within the internal space is isolated from the external air, and thus, scattering of dust from the dust generating portions toward the atmosphere is advantageously prevented.

5 Claims, 5 Drawing Figures

INDUSTRIAL ROBOT

BACKGROUND OF THE INVENTION

The present invention generally relates to industrial handling equipment and more particularly, to a non-dust generating or dust-free industrial robot which is to be used in places where dust present in air must be substantially completely eliminated such as in so-called clean rooms, e.g., in factories for manufacturing semi-conductors, factories for manufacturing appliances related to optical systems, factories for manufacturing precision products, etc.

In semi-conductor manufacturing factories, optical component assembly mills, etc., it has been a recent trend that presence of fine dust particles having particle diameters in the range of 0.5 to 0.1μ or less, becomes the main factors which affect quality and yield of the products. Under the circumstances as described above, even the presence of a human being itself becomes a large obstacle to preserving the non-dust generating or dust-free working condition, thus making it necessary to promote elimination of man-power and introduction of industrial robots.

As a dust scattering prevention device for the purpose as described above, there has conventionally been disclosed, for example, in the "ACCESSORIES CATALOG" published by Intelledex Incorporation, Oregon, U.S.A., a clean room package in which, as shown in FIG. 1, an industrial robot 1 including an upper arm m1, a forearm m2 and an operating hand m3 pivotally connected to each other through joint portions 1a and rotatably mounted on a base 1b via a rotary joint 1f, has its joint portions 1a covered with cover members 2 of a bellows type, thereby to prevent dust generated at the joint portions 1a from scattering out of said joint portions.

In the known arrangement as described above, however, there have been such problems that, since the bellows type cover members 2 themselves function as a pump due to expansion and contraction thereof, dust tends to leak out of gaps between the cover members 2 and the joint portions 1a or that the compactness of the robot 1 is undesirably lost due to use of the bulky cover members 2 on said joint portions 1a. Additionally, since the cover members 2 must be removed for repairing or maintenance of the industrial robot 1, troublesome procedures are required for the repairing and maintenance work.

As a method of preventing scattering of dust without employment of the bellows type cover members as referred to above, there may be considered the practice of completely isolating the interior of the robot from the atmosphere or external air, with respect to the construction of the robot, but as a practical matter, it is difficult to achieve complete airtightness at the movable portions such as rotating portions, sliding portions, etc. of the industrial robot, while, due to the fact that the movable portions themselves tend to be dust generating sources, scattering of dust can not be readily prevented.

SUMMARY OF THE INVENTION

Accordingly, an essential object of the present invention is to provide an improved industrial robot for use in a clean room or the like and in which scattering of dust therefrom is prevented.

Another important object of the present invention is to provide an industrial robot of the above described type which has a simple construction and is accurate in operation, and which may be easily manufactured at low cost.

In accomplishing these and other objects, according to one preferred embodiment of the present invention, there is provided an industrial robot which includes a plurality of arm members, one or a plurality of joint members connected to each of said arm members, bearing means rotatably supporting said joint members, and a driving source for relatively rotating or pivoting said plurality of arm members through said joint members, and is characterized in that there are provided an internal space formed by covering rotating portions and contact portions of said arm members, joint members, bearing means or driving source, by said arm members, joint members, bearing means, or a cover member, or by a combination thereof, and air throttling portions provided in air passages for connecting said internal space with external air so as to separate said internal space from the external air by sucking the air into said internal space.

The industrial robot of the present invention as described above is further provided with exhaust passages for communicating said internal space with an exhaust device, located at part of said arm members, joint members, bearing means or cover member.

In the arrangement according to the present invention as described above, by the air passages communicating the dust generating portions with external air, and the air throttle portions provided within said air passages, the internal air is separated from the external air at said air throttling portions so as to prevent scattering of dust from the dust generating portions into the atmosphere, and thus, a high performance non-dust generating industrial robot having high reliability has been provided in a compact size.

Furthermore, according to the present invention, by the provision of the air passages defined by the structural members, cover members, etc., and the air throttling portions provided in said air passages, and also the exhaust passages which cause air to flow from the outer side of the air throttling portions toward the inner side thereof for discharging into another portion, a high performance industrial robot in which dust is not readily accumulated therein may be achieved by a simple construction.

BRIEF DESCRIPTION OF THE DRAWINGS

These and other objects and features of the present invention will become apparent from the following description of preferred embodiments thereof taken in conjunction with the accompanying drawings, in which.

DETAILED DESCRIPTION OF THE INVENTION

Figure 1:
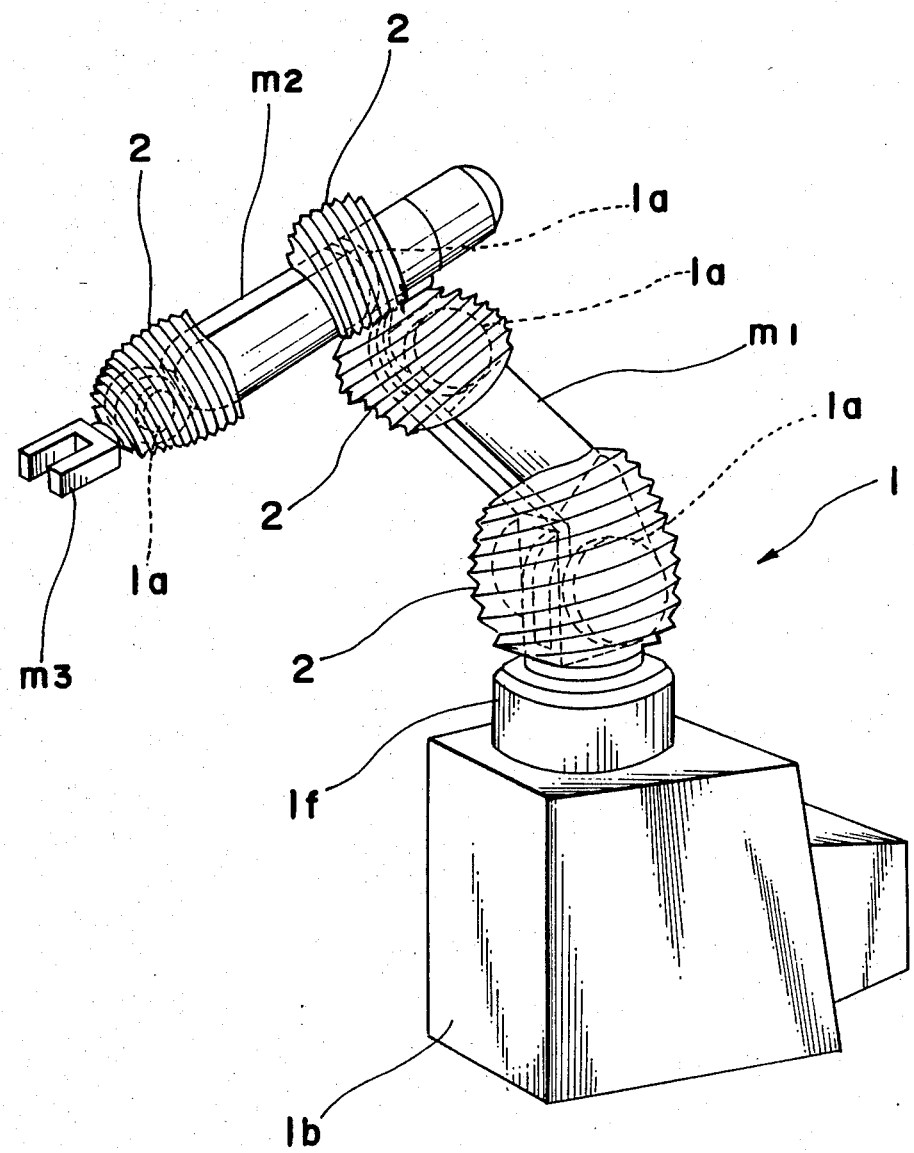
FIG. 1 is the perspective view showing a general appearance of a conventional industrial robot provided with a dust scattering preventing means (already referred to)

Before the description of the present invention proceeds, it is to be noted that like parts are designated by like reference numeral throughout the accompanying drawings.

Figure 2:
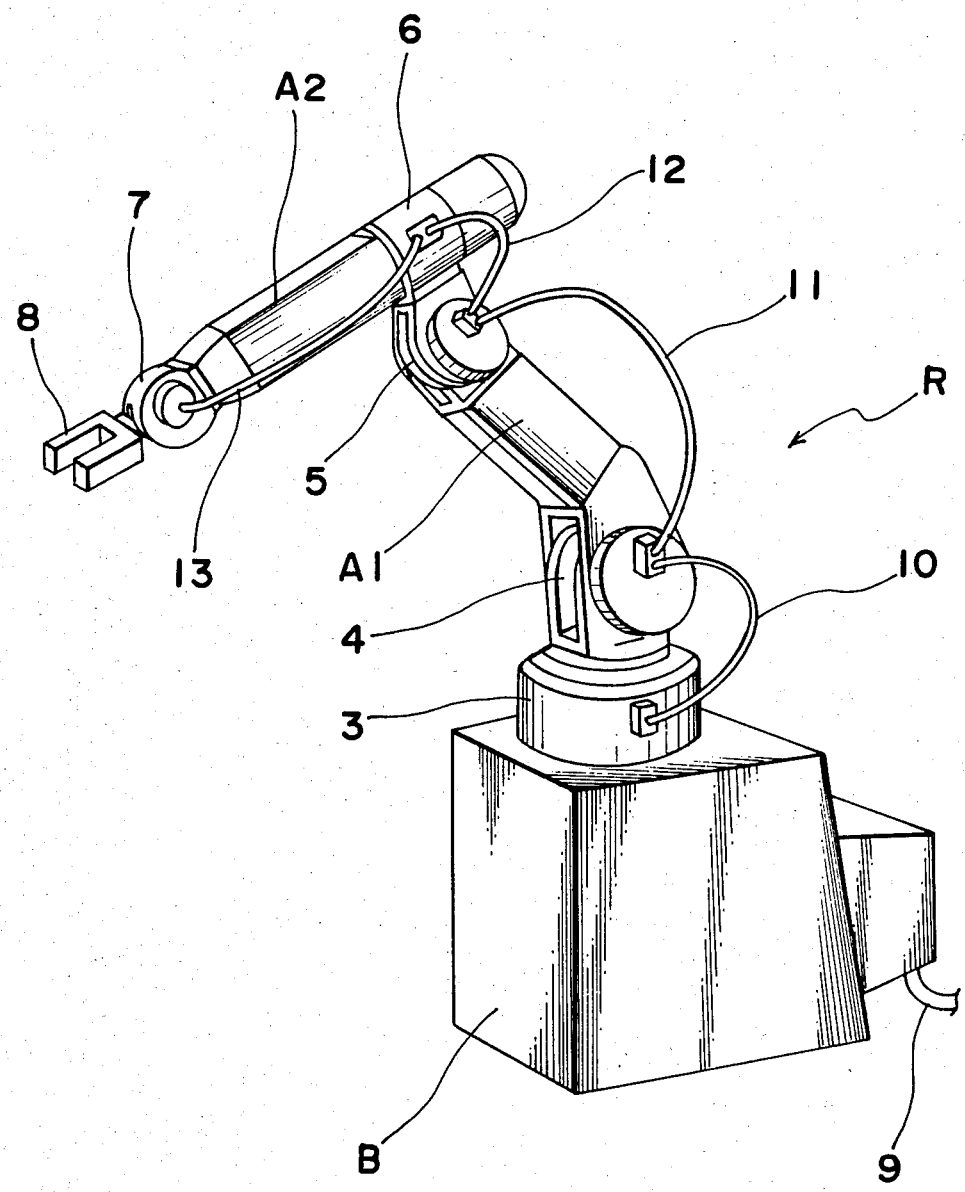
FIG. 2 is a perspective view showing the general appearance of an improved industrial robot according to one preferred embodiment of the present invention.
Figure 3:
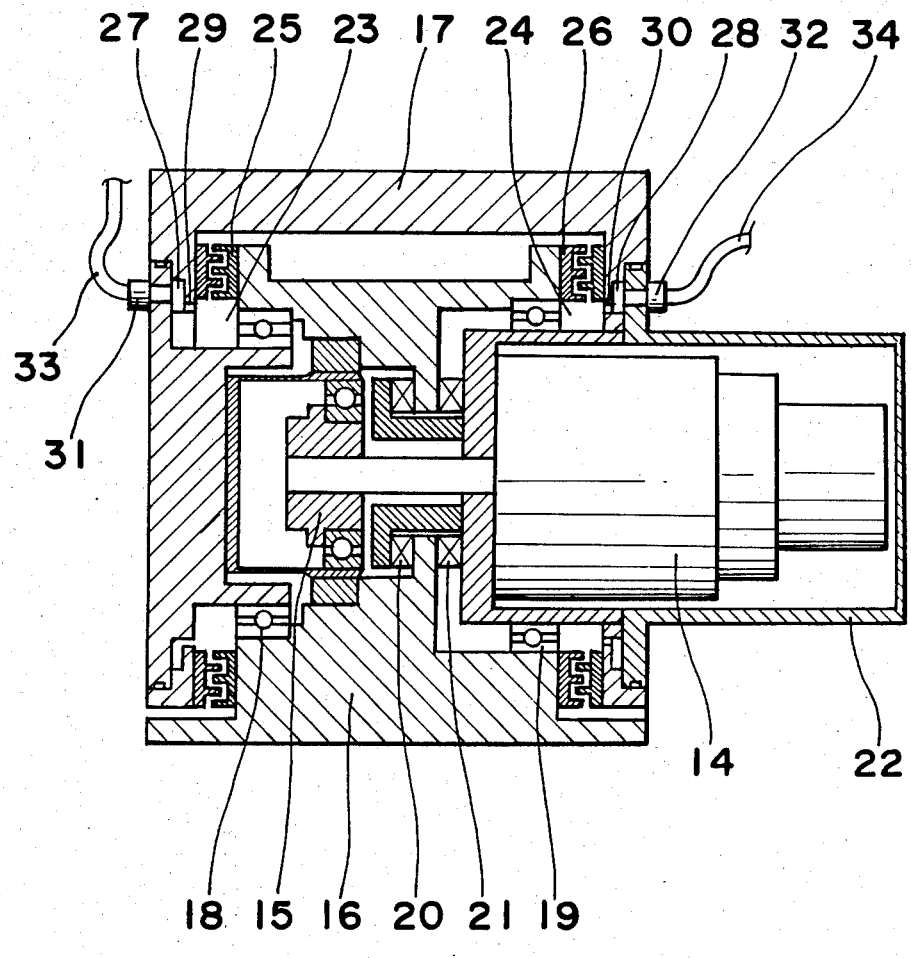
FIG. 3 is a cross-sectional view at one of bending joint portions in the industrial robot in FIG. 2.

Referring now to the drawings, there is shown in FIG. 2, the general appearance of an industrial robot R according to one perferred embodiment of the present invention, with construction of one of bending joint portions thereof being shown in FIG. 3.

The industrial robot R in FIG. 2 generally includes an upper arm A1, a forearm A2, and an operating hand 8 which are pivotally connected to each other through an upper arm bending joint 4, a forearm bending joint 5, a forearm rotating joint 6, and a wrist bending and rotating joint 7, the arm and hand assembly being rotatably mounted on a base B via a rotary joint 3. The industrial robot R is further provided with an exhaust pipe 9 for connecting the robot main body with suction means such as a vacuum pump or the like (not shown), and exhaust pipes 10, 11, 12 and 13 for communicating the respective joint portions 3, 4, 5, 6 and 7 with each other.

In FIG. 3 the bending joint portion as employed in the industrial robot R generally includes a servo-motor 14 provided with an encoder and covered by a cover member 22, a reduction gear 15, a fixed angle member 6 which is one of members constituting the industrial robot, a driven angle member 17 which is also one of members constituting the industrial robot, bearing members 18 and 19 for rotatably supporting the driven angle member 17 and fixed angle member 16 for relative rotation therebetween, and thrust bearings 20 and 21. Main dust generating portions in the joint portion as described above are the servo-motor 14, reduction gear 15, bearing members 18 and 19, and thrust bearings 20 and 21, and these dust generating portions are communicated with the external air or the atmosphere through air passages 23 and 24. The joint portion in FIG. 3 is further provided with air throttling portions 25 and 26 of non-contact labyrinth type seal and the like each including fins with small clearances therebetween and air expanding portions disposed at the front and rear sides thereof, and provided in said air passages 23 and 24, exhaust passages 27 and 28 having openings 29 and 30 in the vicinity of the air throttling portions 25 and 26, exhaust pipes 33 and 34 coupled to the exhaust passages 27 and 28 by exhaust connectors 31 and 32, thus forming exhaust flow paths by the openings 29 and 30, exhaust passages 27 and 28, and exhaust pipes 33 and 34 connected by the connectors 31 and 32.

The operation of the industrial robot according to the present invention having the construction as described above will be descrbied hereinbelow.

Firstly, in the industrial robot, dust is mainly produced from the movable portions such as engaging portions of gears, bearing members, brushes of the motor, etc., and in the foregoing embodiment, the main dust generating portions are the servo-motor 14, reduction gear 15, bearing members 18 and 19, and thrust bearings 20 and 21. These dust generating portions are covered by the fixed angle member 16, driven angle member 17, and cover member 22, with the generated dust being introduced into the air passages 23 and 24 through the bearing members 18 and 19. On the other hand, by exhausting air through the exhaust pipes 33 and 34 provided in the robot main body, air within the air throttling portions 25 and 26 is discharged through the exhaust flow paths together with the dust, while air from outside the robot is drawn through the air throttling portions 25 and 26 toward the interior of the robot, with the air being compressed in the small clearances of the air throttling portions 25 and 26, and thus, counterflow of air can be completely stopped, with a consequent prevention of the dust in the interior from scattering outside.

Similarly, in the other bending joint portions also, scattering of dust toward the outside can be prevented by providing the air throttling portions in the air passages between the dust generating portions and the atmosphere for exhausting in the vicinity of said air throttling portions.

Meanwhile, the air containing dust sucked from the respective joint portions is passed through the exhaust pipes 10, 11, 12 and 13, and drawn out and removed through the exhaust pipe 9 by the vacuum pump or the like referred to earlier.

Accordingly, the industrial robot R of the present invention does not scatter dust, and may be used safely even in a clean room.

Furthermore, since air is exhaused uniformly through the air passages of the respective joint portions constituting the robot main body, according to the present invention, a highly reliable non-dust generating industrial robot without any counter-flow of air from the interior toward the outside through the air throttling portions has been advantageously provided by adjusting the clearances between forward ends of the fins and the number of fins at said air throttling portions.

Figure 4:
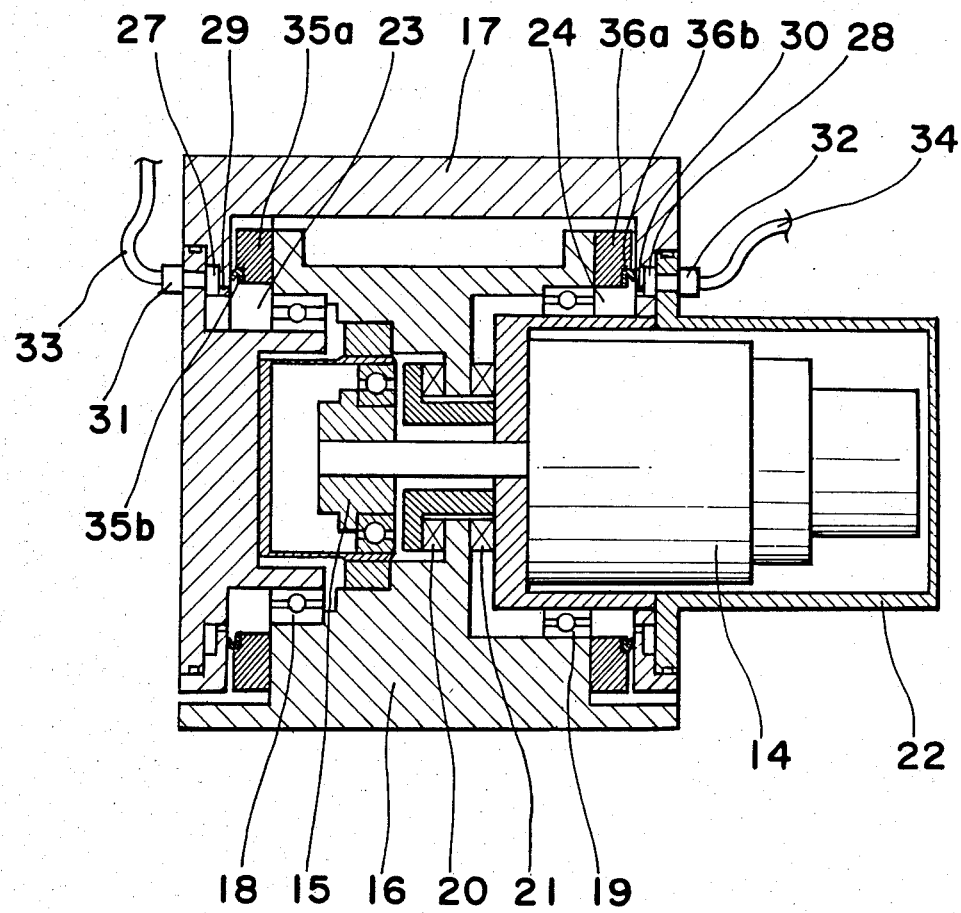
FIG. 4 is a view similar to FIG. 3, which particularly shows a modification thereof.

Referring to FIG. 4, there is shown a modification of the construction of the joint portion shown in FIG. 3. In the modified joint portion of FIG. 4, the air throttling portions 25 and 26 descrbied as constituted by the non-contact labyrinth type seal in the joint portion of FIG. 3 and provided in the air passages 23 and 24, are replaced by air throttling portions 35a and 36a which are constituted by members made of a porous material having a large number of through-pores with very small diameters, and which are respectively provided with contact lips 35b and 36b formed by Teflon material and the exhaust flow paths are formed by the openings 29 and 30, exhaust passages 27 and 28, and exhaust pipes 33 and 34 connected by the connectors 31 and 32 in a similar manner as in the joint portion in FIG. 3.

In the modified joint portion of FIG. 4, dust generated at the dust generating portions is introduced into the air passages 23 and 24 as described earlier, and the contact lips 35b and 36b are also regarded as dust generating portions. By discharging air through the exhause pipes 33 and 34 provided in the robot main body, air within of the air throttling portions 35a and 36a is exhausted, while the air throttling portions 35a and 36a permit air to be drawn into the interior from the atmosphere at all times. Moreover, dust particles produced from the contact lip portions 35b and 36b, are drawn into the interior through the air throttling portions 35a and 36a of the porous material located at the outside of the contact lips 35b and 36b, and thus, scattering of dust from the interior toward the outside can be advantageously prevented.

Since other constructions and effects of the modified joint portion in FIG. 4 as described above are generally similar to those of the embodiment of FIG. 3, a detailed description thereof is omitted for brevity, with like parts being designated by like reference numerals.

Figure 5:
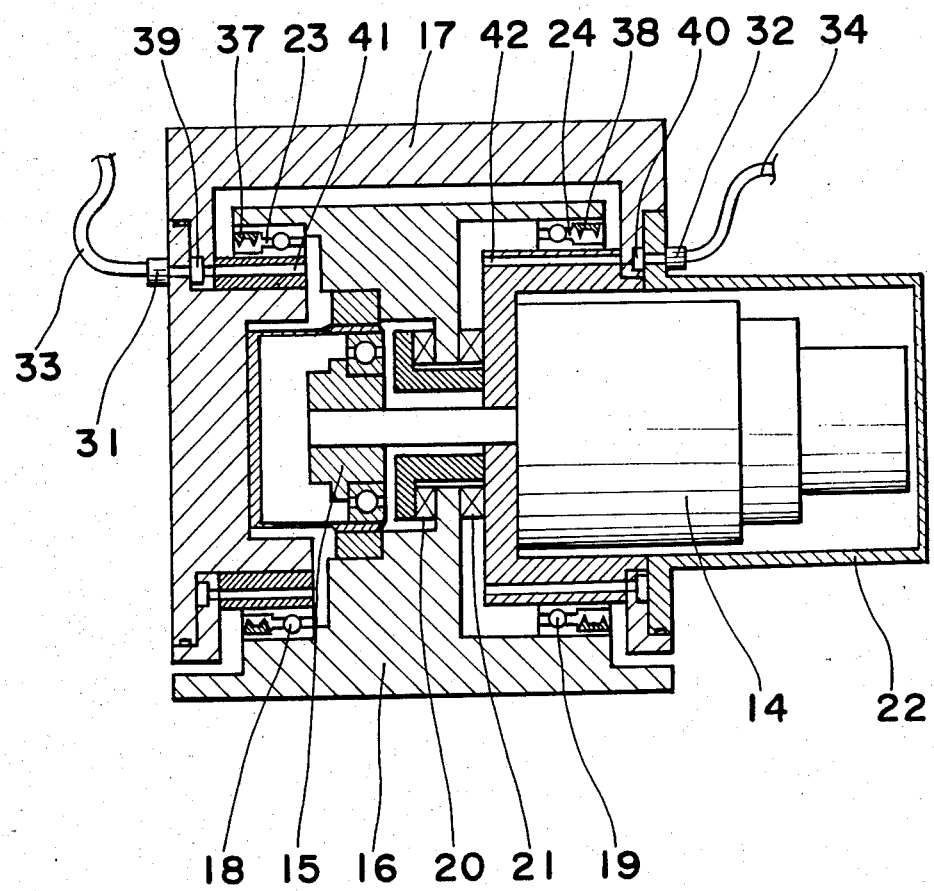
FIG. 5 is also a view similar to FIG. 3, which particularly shows another modification thereof.

Referring further to FIG. 5, there is shown another modification of the joint portion of FIG. 3. In FIG. 5, the air throttling portions 25 and 26 in the joint portion of FIG. 3 are replaced by air throttling portions 37 and 38 provided in the air passages 23 and 24, and having non-contact lips integrally attached to the outer sides of the bearing members 18 and 19, while the air exhaust passages 27 and 28 in FIG. 3 are also replaced by exhaust passages 39 and 40 having openings 41 and 42 at the inner sides of the bearings 18 and 19, with the exhaust flow paths being constituted by the openings 41 and 42, exhaust passages 39 and 40, and exhaust pipes 33 and 34 connected thereto by the connectors 31 and 32.

In the modified joint portion of FIG. 5, dust generated at the dust generating portions as described earlier is led out into the air passages 23 and 24. By exhausting air through the exhaust pipes 33 and 34 provided in the robot main body, air within the air throttling portions 37 and 38 is discharged together with the dust, while the air throttling portions 37 and 38 permit air to be drawn into the interior from the atmosphere. In the above case, since air flowing in from the atmosphere is compressed at the very small clearances of the lip portions, there is no counter-flow of air, and thus, scattering of dust from the interior toward the outside can be completely prevented.

Since other constructions and effects of the modified joint portion in FIG. 5 are generally similar to those in the joint portion of FIG. 3, a detailed description thereof is omitted for brevity, with like parts being designated by like reference numerals.

It should be noted here that in the foregoing embodiment and modifications, although the present invention has been described with reference to a multi-joint type industrial robot, the concept of the present invention is not limited to its application to such a multi-joint type industrial robot alone, but may readily be applied to a linear displacing portion as in a cross type industrial robot by providing air throttling portions having small clearances and exhaust flow paths, thereby to provide a high performance industrial robot free from dust generation.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:
1. An industrial robot comprising:
    a plurality of arm members;
    at least one arm joint having at least two joint members rotatable relatively to each other and to the respective ones of which a corresponding arm member is connected;
    bearing members rotatably supporting said arm joint members for rotation relative to each other;
    a driving member connected to said arm joint members for relatively rotating said plurality of arm members through said arm joint members;
    cover means constituted by parts of at least two of said members and defining an internal space within said arm joint within which the remainder of said members are confined, said parts having at least one cover joint therebetween at which said parts are relatively rotatable and said cover joint extending through said cover means from the space around said arm joint to said internal space, each such cover joint providing an air flow throttling means therethrough for connecting said internal space with the space around said arm joint, said throttling means being constituted by air flow path constricting means for throttling air flow through all of said cover joint for inhibiting flow of air between said internal space and the space around said arm joint; and
    means for removing air from within said internal space consisting of air suction means connected to said cover means for sucking air from said internal space, whereby the internal space is kept at a reduced pressure as compared with the space around said arm joint and air flows only into said internal space through said throttling means.

2. An industrial robot as claimed in claim 1 in which said air suction means is connected to said cover means at a point immediately adjacent the inner side of said throttling means.

3. An industrial robot as claimed in claim 1 in which said throttling means comprises a non-contact labyrinth type seal having a plurality of closely spaced interleaved fins having small clearances therebetween and air expanding portions at the front and rear sides thereof.

4. An industrial robot as claimed in claim 1 in which said throttling means comprises a porous member having a large plurality of through-pores therethrough having very small diameters.

5. An industrial robot as claimed in claim 1 in which said cover means comprises portions of said arm members, and said bearing means is in said cover joint, and said throttling means comprises a throttling member in said arm joint on the side of said bearing member which is toward the space around said arm joint.

* * * * *